J. B. LOCKER.
HORSESHOE.
APPLICATION FILED JUNE 5, 1909.

957,072.

Patented May 3, 1910.

2 SHEETS—SHEET 1.

Witnesses
Frank B. Hoffman
J. W. Garner

Inventor
John B. Locker
By Victor J. Evans
Attorney

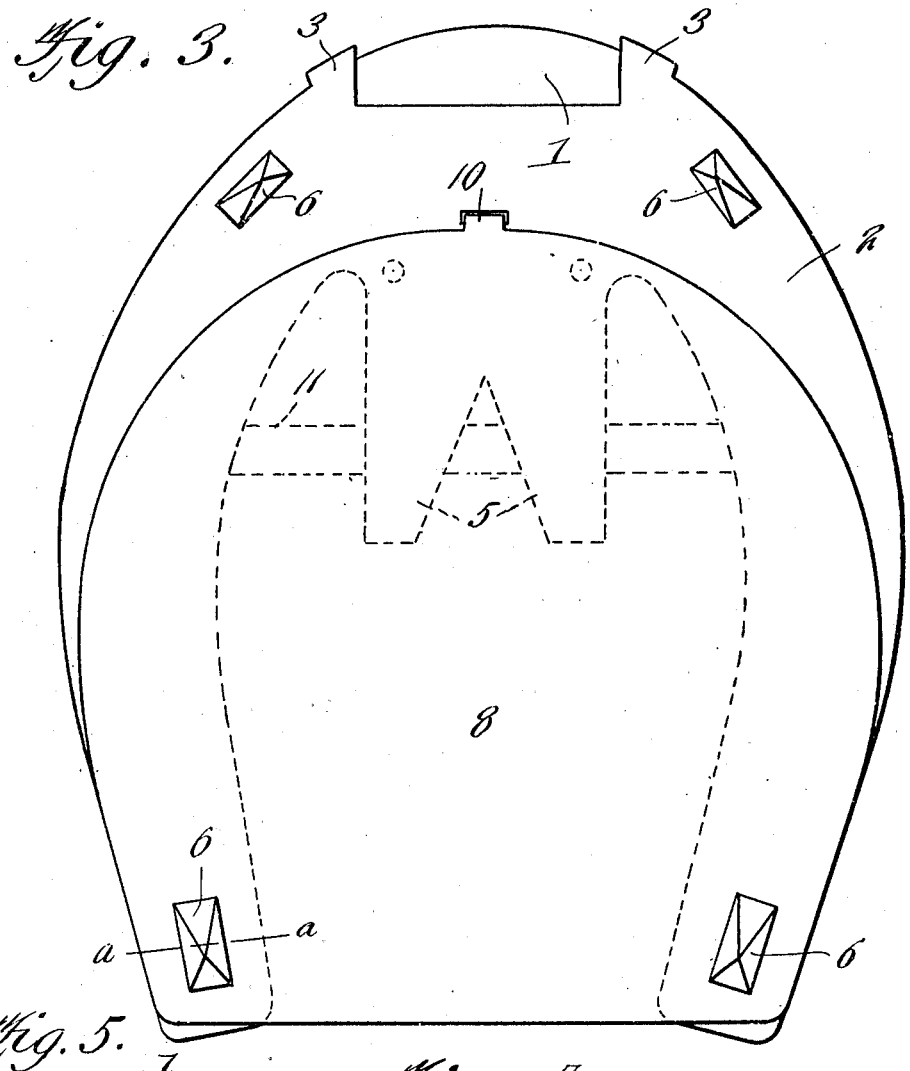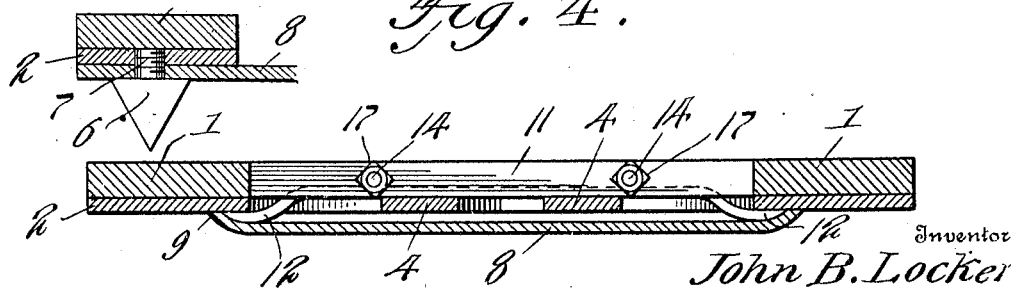

UNITED STATES PATENT OFFICE.

JOHN B. LOCKER, OF ST. LOUIS, MISSOURI.

HORSESHOE.

957,072.  Specification of Letters Patent.  Patented May 3, 1910.

Application filed June 5, 1909. Serial No. 500,252.

*To all whom it may concern:*

Be it known that I, JOHN B. LOCKER, a citizen of the United States, residing at St. Louis city and State of Missouri, have invented new and useful Improvements in Horseshoes, of which the following is a specification.

This invention relates to improvements in horse shoes, particularly with reference to means for providing a horse shoe with calks which may be attached to the shoe or detached therefrom at will, so that a horse provided with ordinary horse shoes may be expeditiously sharp-shod when necessary to enable him to travel safely over ice and snow and the said invention consists in the construction, combination and arrangement of devices hereinafter described and claimed.

Figure 1:
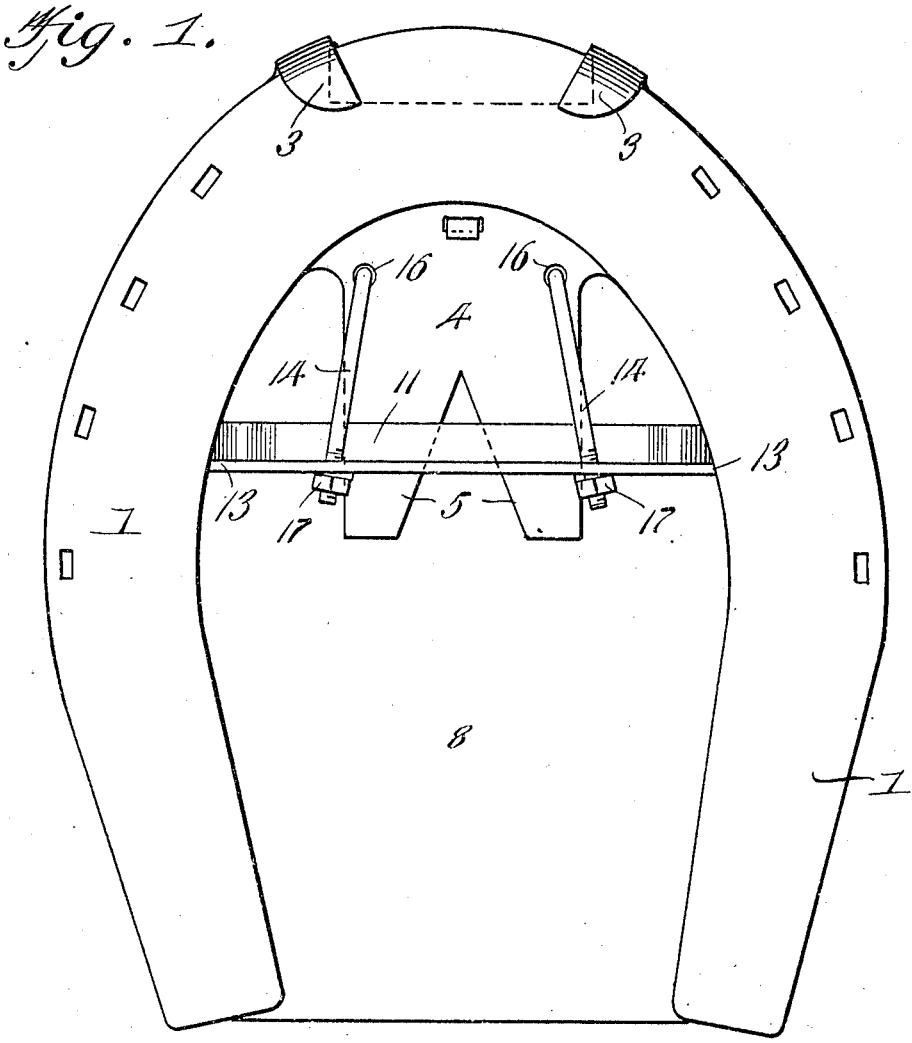
Figure 2:
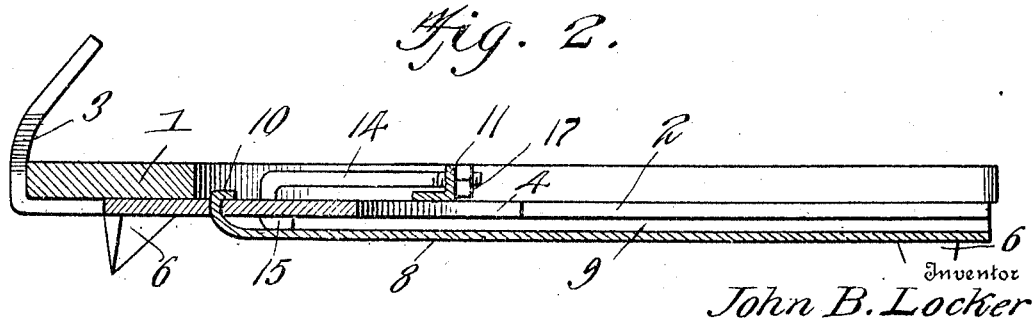

In the accompanying drawings:—Figure 1 is a plan of a horse shoe provided with calk attaching devices constructed in accordance with my invention. Fig. 2 is a vertical longitudinal central sectional view of the same. Fig. 3 is an inverted plan of the same. Fig. 4 is a transverse sectional view of the same. Fig. 5 is a detail sectional view of the same on the plane indicated by the line *a—a* of Fig. 3.

An ordinary horse or mule shoe is indicated in the drawings at 1. In accordance with my invention, I provide a plate 2 which is of a size and shape adapting it to bear on the under sides of the shoe. The said plate is provided at its front end with upturned members 3 to engage the toe of the shoe and bear against the same. The said plate is further provided at its front, central portion with a rearwardly extending arm 4 which is here shown as forked as at 5 at its rear end. The said plate 2 is provided near its front and at its heel end with calks 6 which are provided with shanks 7 which are screwed in threaded openings in the plate so that the said calks may be detached from the plate. Within the scope of my invention, the said calks may be of any suitable construction. They are here shown as of substantially inverted pyramidal form presenting sharpened points to engage the ice and prevent the horse from slipping thereon.

I also provide a shield plate 8 which is of a size and shape adapting it to cover the major portion of the under side of the plate 2 and hence to cover the bottom of the hoof so as to prevent the hoof from being injured by objects on which the horse may step and to also prevent ice or snow from "balling" under the hoof. The said shield plate has upturned side edges 9 which bear directly against the under side of the plate 2 and is also provided at its front end with a hook arm or lug 10 which extends through an opening in the plate 2 and the upper end of which is turned rearwardly and bears on the upper side of the said plate so as to effectually connect the front end of the shield plate, to the plate 2 which carries the calks. The shanks of the heel calks pass through openings in the heel portion of the shield plate and serve thereby to connect the heel portion of the shield plate to the heel portion of the calk plate as will be understood. When the said heel calks have been removed, the shield plate may be readily detached from the calk plate by first disengaging the hook or lug 10 from the calk plate.

I also provide a clamp bar 11 which bears on the upper side of the arm 4 of the calk plate, transversely with reference to the calk plate and the shoe and the ends of which are down-turned as at 12 and caused to bear on the upper side of the shield plate and also under the calk plate. The said clamp bar is here shown as L-shaped in cross section and provided with an upstanding flange, the ends of which bear against the opposing sides of the shoe and form shoulders 13. Bolts 14 are provided at their front ends with hooks 15 which pivotally engage and extend through openings 16 in the plate 2 at the front end of the arm 4 thereof and the said bolts pass through openings in the upstanding flange of the clamp bar and are provided with nuts 17 which bear against the rear side of the said clamp bar and coact with said bolts and said clamp bar to firmly clamp the calk plate to the shoe as will be readily understood.

It will be understood that my improved calk devices may be made of any desired size and shape and adapted to be used in connection with a horse or mule shoe of any size.

What is claimed is:—

A calk plate for application to the under side of a horse shoe and provided with means for clamping said plate to said shoe, in combination with a shield plate bearing under the calk plate having means at its front end detachably connecting the shield plate to the calk plate and heel calks detachably connecting the heel plate to the calk plate, said heel calks being removable.

In testimony whereof I affix my signature in presence of two witnesses.

JOHN B. LOCKER.

Witnesses:
JACOB HAUSER,
OTTO BECKER.